Oct. 8, 1968  B. L. WILKINSON  3,405,342
VOLTAGE REGULATOR FOR D.C. INVERTER TYPE POWER SUPPLY
Filed Aug. 1, 1966
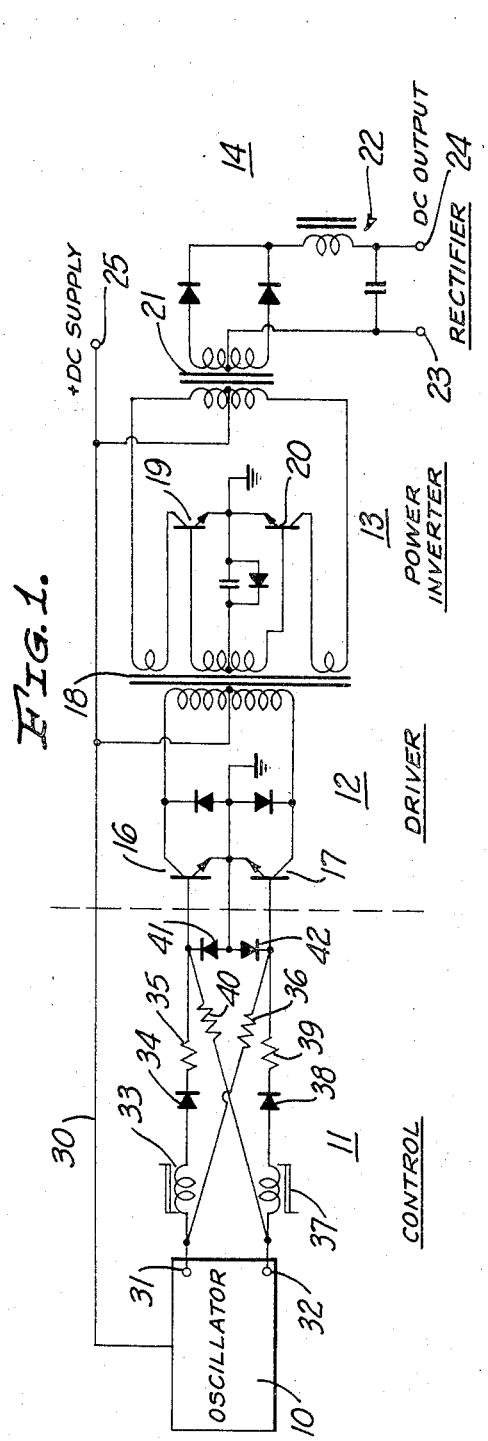
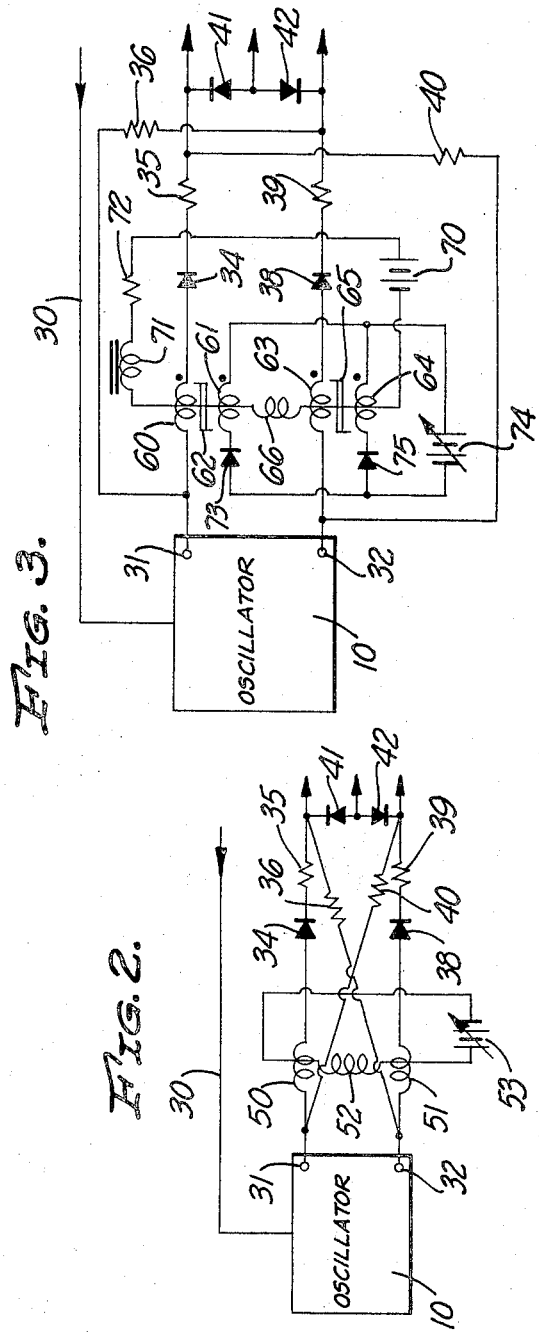
INVENTOR
BRUCE L. WILKINSON
BY HIS ATTORNEYS
HARRIS, KIECH, RUSSELL & KERN "# United States Patent Office 3,405,342
Patented Oct. 8, 1968

3,405,342
VOLTAGE REGULATOR FOR D.C. INVERTER TYPE POWER SUPPLY
Bruce L. Wilkinson, Torrance, Calif., assignor, by mesne assignments, to Varo, Inc., Garland, Tex., a corporation of Texas
Filed Aug. 1, 1966, Ser. No. 569,197
7 Claims. (Cl. 321—2)

ABSTRACT OF THE DISCLOSURE

A voltage regulator for use in providing a controlled output voltage from a D.C. power source which may vary in amplitude over a wide range. A D.C. power supply of the inverter type, with a driver stage, power converter stage and a rectifier stage. A voltage regulator incorporating an oscillator for energizing the driver stage, with the oscillator energized from the D.C. power source and having an amplitude varying as a function of the amplitude of the D.C. power source and having a frequency substantially independent of the amplitude of the D.C. power source.

---

This invention relates to voltage regulators for use in providing a controlled output voltage from a D.C. power source which may vary in amplitude over a wide range. The invention is intended for use with a D.C. power supply of the inverter type, incorporating a driver stage, a power inverter stage and a rectifier stage. Power supplies of this type are widely used today and a variety of circuits suitable for the various stages are known and are usable with the present invention. The invention may also be used to provide an A.C. voltage output which the average voltage for each half cycle will be a constant, by omitting the rectifier stage.

The present invention contemplates a new and improved control for the driver stage of a power supply. In a typical situation, a D.C. power source may have a plus and minus variation in amplitude of ten percent and the variation may occur at frequencies in the audio range. It is often necessary to reduce the variation by a factor of a thousand and it is conventional to attempt this type of regulation utilizing large filter sections and feedback from the regulator output. It is an object of the present invention to provide a new and improved type of regulator wherein the conduction or on time of the power transistors is varied as a function of the amplitiude of the D.C. power source, without requiring the use of feedback from the power supply output. In the regulator of the invention, the driver stage is energized from an oscillator through a control circuit. The oscillator and the control circuit function to switch the driver stage transistors off and on and to maintain the transistors in the desired state for the desired period of time. It is an object of the invention to provide a regulator which incorporates this mode of control for the driver stage.

It is an object of the invention to provide in a voltage regulator, an oscillator for energizing the driver stage with the oscillator energized from the D.C. power source and having an ampiltude varying as a function of the amplitude of the D.C. power source and having a frequency substantially independent of the amplitude of the D.C. power source.

It is an object of the invention to provide in a voltage regulator, circuit means for coupling the oscillator to the driver stage transistors for cyclically switching the transistors between on and off states with each half cycle of the oscillator output with the transistors out of phase with each other. A further object is to provide such a circuit means including variable impedance integrating means for providing a high impedance at the start of a half cycle of the oscillator output to switch a transistor to one state, and for changing to a low impedance when the integral of the oscillator output voltage with time reaches a predetermined value to switch the transistor to the opposite state prior to the end of the half cycle, whereby the conduction times in the driver stage and hence in the inverter stage are varied as a function of the magnitude of the D.C. source.

It is a specific object of the invention to provide such a regulator including means in the control circuit for changing the predetermined value of the integral and thereby setting the regulator output voltage at a desired value. An additional object is to provide such a regulator which may also incorporate a feedback control from the power supply output when desired.

It is a specific object of the invention to provide a regulator in which the variable impedance integrating means is provided by a saturable magnetic core means which functions both as the integrating device and as the variable impedance device. An additional object is to provide a variety of saturable magnetic core means suitable for use in the regulator of the invention.

The invention also comprises novel circuit arrangements and combinations of parts, which will more fully appear in the course of the following description. The drawing merely shows and the description merely describes preferred embodiments of the present invention which are given by way of illustration or example.

In the drawing:
FIG. 1 is a schematic diagram of a preferred form of the regulator of the invention;
FIG. 2 is a schematic diagram of an alternative form of the control stage of the regulator of FIG. 1; and
FIG. 3 is a schematic diagram of another alternative form of the control stage of the regulator of FIG. 1.

The power supply of FIG. 1 includes an oscillator 10, a control stage 11, a driver stage 12, a power inverter stage 13, and a rectifier stage 14. The driver, power inverter and rectifier stages are conventional in design and operation and various known circuits may be utilized. Where an A.C. output is desired the rectifier stage may be omitted.

The control stage 11 provides for cyclically switching the transistors 16, 17 of the driver stage off and on, with the two transistors operating out of phase. The driver stage is coupled to the power inverter stage via transformer 18 and serves to turn the power transistors 19, 20 off and on, providing an A.C. output at the transformer 21. The A.C. power is rectified in the rectifier stage, which may include a filter section 22 for reducing the ripple voltage. The D.C. output is developed at the output terminals 23, 24. In a typical installation, the switching frequency of the inverter will be in the range of 5 kc. to 50 kc. so that effective filtering can be achieved by the filter 22 utilizing relatively small components. However, the D.C. voltage source provided at terminal 25 may have a substantial variation at a relatively low frequency. For example, a 28 volt D.C. source may have a 3 volt RMS variation in the frequency range of 10 c.p.s. to 100 kc. Conventional filters for reducing this type of variation are usually prohibitive in size and weight.

The oscillator 10 may be conventional in design and typically is a square wave oscillator designed to operate at the desired switching frequency of the power inverter stage. The frequency of the oscillator output is substantially independent of the amplitude of the D.C. power source energizing the oscillator but the amplitude of the oscillator output varies as a function of the amplitude of the D.C. power source and normally varies linearly with the D.C. power source.

The oscillator 10 may be conventional in design but is energized from the same D.C. power source as is the"

power inverter. As indicated in FIG. 1, the oscillator 10 is connected to the power supply terminal 25 via line 30.

The oscillator output is developed at terminals 31, 32. Terminal 31 is connected to the base of the driver stage transistor 16 through the winding of a saturable core reactor 33, a rectifier 34 and a resistance 35. Terminal 31 is also connected to the base of the driver stage transistor 17 through a resistor 36. The oscillator output terminal 32 is symmetrically connected. The winding of a saturable core reactor 37, a rectifier 38 and a resistor 39 are connected in series between the terminal 32 and the base of the transistor 17. A resistor 40 is connected between the terminal 32 and the base of the transistor 16. A rectifier 41 is connected between circuit ground and the base of the transistor 16 and a rectifier 42 is similarly connected between circuit ground and the base of the transistor 17. The rectifiers 41, 42 limit the negative bias voltage on the bases of transistors 16, 17 by clamping the base voltages near circuit ground, thereby protecting the emitter-to-base junctions. This clamping action also provides a stable voltage level with respect to oscillator terminals 31, 32.

The control stage 11 provides for coupling the oscillator output to the driver stage transistors 16, 17 for cyclically switching the transistors between on and off states. In the specific circuit illustrated, a power inverter transistor is on when the corresponding driver transistor is off and the power inverter transistor is off when the corresponding driver transistor is on. Also, a positive voltage at a driver transistor base will turn the transistor on while a negative voltage will turn the transistor off.

The reactors 33, 37 function as variable impedance integrating devices. For example, at the start of a positive going half cycle of oscillator output at the terminal 31, the reactor 33 presents a high impedance and a negative voltage is applied to the base of the transistor 16 through the resistor 40. When the flux in the reactor core builds up to the switching point, the reactor switches to a low impedance and the voltage at the base of the transistor 16 rises, switching the transistor from the off state to the on state and thereby switching the corresponding power inverter transistor from the on state to the off state.

The amount of flux buildup in the reactor core required to produce the impedance change is a function of the design of the reactor and is substantially a constant. The amount of flux is directly proportional to the integral of the applied voltage with time so that the impedance change occurs at a given integral value. With a higher D.C. supply voltage and hence a higher oscillator output voltage, the time required to attain the predetermined value will be shorter and the power inverter transistor will be on for a shorter period of time. Conversely, with a lower D.C. supply voltage and hence a lower oscillator output voltage, the time required to reach the predetermined value will be longer and the power inverter transistor will be on for a longer period of time.

During this same half cycle, the positive oscillator output voltage at the terminal 31 is applied to the base of the transistor 17 through the resistor 36 and functions to maintain the transistor 17 on and hence the corresponding power inverter transistor off. The rectifier 38 in series with the winding of the reactor 37 blocks current in the reactor during the negative half cycle. The resistor 35 in series with the winding of the reactor 33 functions as a current limiting resistor.

The operation of the control circuit during the second half cycle of the oscillator output is the same as described above, with the reactor 37 being switched from the high impedance state to the low impedance state. The response time of this type of voltage regulator is very fast as correction is applied directly from the D.C. supply with every half cycle of oscillator output. The regulator is very efficient since the power inverter transistors are turned on only for the time necessary to provide the desired output voltage. Another advantage of the control circuit lies in the fact that the driver transistors are not triggered but rather are switched and held in the on and off states, providing much greater noise immunity in the circuit.

The regulator circuit of FIG. 1 functions to maintain a substantially constant D.C. voltage at the output terminals 23, 24, independent of variations in the D.C. supply voltage at the terminal 25. In the A.C. output from the transformer 21, the average voltage for each half cycle will be substantially a constant. The magnitude of the output voltage can be adjusted by changing the frequency of the oscillator 10 or by changing the characteristics of the reactors 33, 37. These are relatively complicated forms of control and some alternative embodiments of the control stage incorporating other means for changing the magnitude of the output voltage are illustrated in FIGS. 2 and 3.

The control stage of FIG. 2 includes a full wave magnetic amplifier having a gate winding 50 connected to the oscillator terminal 31 and a gate winding 51 connected to the oscillator terminal 31 and a gate winding 51 connected to the oscillator terminal 32. A control winding 52 of the magnetic amplifier is connected to a D.C. current source, illustrated as a variable voltage supply 53. The operation of the control stage of FIG. 2 is the same as that of the control stage of FIG. 1. The value of the integral of oscillator output voltage with time is a function of the current in the control winding 52, since the switching point or impedance change point of a gate winding varies with the magnitude of the control current.

With the control stage of FIG. 2, the desired output voltage at the terminals 23, 24 can be changed by varying the current in the winding 52. This may be performed manually if desired. In an alternative arrangement, the current in the winding 52 may be made a function of the output voltage at the terminals 23, 24, providing a negative feedback connection for output voltage regulation.

The control stage of FIG. 3 illustrates the utilization of a new type of magnetic amplifier in the voltage regulator of the invention. Gate windings 60 and 61 are provided on a core 62. Similar gate windings 63 and 64 are provided on another core 65. A control winding 66 is provided on both cores 62 and 65. The control winding 66 is illustrated in FIG. 3 as a single coil but in practice one coil would be utilized on the core 62 and a second coil on the core 65 with the coils preferably connected in series.

The control winding 66 is connected to a D.C. current source, illustrated as a battery 70, through a filter choke 71 and a current limiting resistance 72. The current source 70 may be made adjustable to provide for initial setting of the operation of the magnetic amplifier.

The gate windings 60 and 63 are connected in the control stage in the same manner as the windings of the reactors 33 and 37 of the control stage of FIG. 1. The gate winding 61 is connected in series with a rectifier 73 across another D.C. voltage source, illustrated as a battery 74. The gate winding 64 is connected in series with a rectifier 75 across the source 74. The rectifiers 73, 75 are polarized opposite to the source 74.

In the operation of the circuit of FIG. 3, the gate winding 61 controls the resetting of the core 62 and the gate winding 64 similarly controls the resetting of the core 65. The point to which the core is reset may be changed by changing the voltage from the source 74, thereby providing a control on the value of the integral at which the other gate winding changes from a high impedance state to a low impedance state. As in the magnetic amplifier of FIG. 2, the source 74 may be set manually or may be utilized as a feedback control from the output of the power supply.

The magnetic amplifier of FIG. 3 provides a variable impedance integrating device with the operation thereof independent of the core characteristics. The gain of the magnetic amplifier is not as high as that of some other types but the gain is linear and the device has a relatively fast response time.

All magnetic devices work on the principle that while the magnetic flux in a core is changing, a winding on this core will support a voltage proportional to the rate of change of flux and the number of turns in the winding.

If a core made of square loop material (square loop material in this case is defined as magnetic material whose magnetization flux level will not change significantly when any applied magnetizing force is removed) magnetized to flux level $B_1$, has a voltage applied to a winding wound on this core for a short period of time, the flux will change to a new value $B_2$. This change in flux, $B_2-B_1$, is directly proportional to the integral of the applied voltage during the period of time the voltage was applied. If the voltage remains across the coil long enough, B will continue to change until it reaches the saturation value $B_{max}$. Since the material of the core cannot be magnetized beyond $B_{max}$, the value of B stops changing.

During the time B was changing, the current flowing in the coil was no greater than what was required by the core material to cause a change in B. Now that B is not changing the current is determined by the applied voltage and the D.C. resistance of the circuit. Thus, the coil behaves as a switch which is open until the voltage time integral reaches a predetermined value, determined by $B_{max}-B_1$, at which time the switch closes.

This device may now be made to operate on transistor switches, such as those in the driver stage, causing the transistor switch to be closed when the coil is in the open or blocking state. If these transistors are feeding a load which is supplied by a voltage that is directly proportional to the voltage feeding the saturable coil, then the load will have a pulse whose voltage-time integral is directly proportional to the voltage-time integral of the voltage appearing across the saturable coil.

The average or D.C. value of a series of such pulses is simply the value of this integral multiplied by the pulse repetition rate of frequency. In most cases, two of the above systems are employed. They operate alternately and with opposite polarity so as to generate an A.C. voltage in which one of the above pulses constitutes a half cycle. The saturable cores are alternately set back to $B_1$ from $B_{max}$ during the half cycle that the opposite core is controlling. This A.C. voltage is then transformed to the desired voltage, rectified to a train of pulses and filtered to provide D.C. The D.C. value is given by the voltage-time integral which in turn is given by $B_{max}-B_1$ and the frequency. The D.C. voltage level does not depend on the input voltage; it is determined by $B_{max}$, $B_1$, and the operating frequency of the device.

In a conventional magamp system, a second winding is wound on the saturable core and a current is passed through this winding of just the right magnitude to cause the flux to return to $B_1$ during the resetting portion of the cycle. For practical reasons, it is desirable to control both saturable coils with the same current source. Therefore, these second, or control windings, are usually seriesed. This means that the two cores must be closely matched or the value of $B_1$ for one will differ significantly from the value of $B_1$ for the other, which would result in a severe unbalance in the system. For the same reason, the $B_{max}$ values must be matched. In this system, the output voltage is controlled by simply changing the current in the control winding. The disadvantages are:

(1) The current required to set $B_1$ and the value of $B_{max}$ varies with temperature making the system susceptible to temperature drifts.

(2) At high operating frequencies (above 2 kc.) the current needed to set the core to $B_1$ varies with the magnitude of the driving voltage which destroys the independence of the output voltage from the input voltage. Also, frequency variations will affect the output voltage, which imposes the requirement for a very stable oscillator.

(3) The high inductance of the control winding limits the speed of charging the control current.

In the new system of FIG. 3, a third winding 61, 64 is added to each core 62, 65 respectively. The control winding 66 is biased with more than sufficient current to set both cores from $B_{max}$ back to $B_1$. When the flux in a core is changing from $B_{max}$ to $B_1$, a voltage is induced in the coils with a voltage-time integral equal to $B_{max}-B_1$. The only difference from the previous case when the flux was changing from $B_1$ to $B_{max}$ is that the voltage is now opposite polarity. If during this resetting period, the induced voltage is limited to some value E by a load on the third winding, then the voltage-time integral reduces to the product of E times the period for a half cycle, where E is the voltage of the source 74. In this case, the value of $B_{max}-B_1$ is controlled directly and is independent of $B_{max}$, other core characteristics and input voltage. Another interesting aspect of this system is the dependence of the voltage-time integral on frequency. The integral is directly proportional to the period which is inversely proportional to frequency. However, the D.C. output voltage is given by the integral multiplied by the frequency. Therefore, since the integral is inversely proportional to the operating frequency, the D.C. output is independent of the operating frequency, eliminating the need for a stable oscillator.

This system then has the following advantages:

(1) Independent from core characteristics, input voltage, and frequency.

(2) Since the $B_{max}-B_1$ value is set each cycle by E and since the magamp presents no physical limit to the rate of change of E (like a large capacitance) then the speed of response can be made to approach the theoretical maximum of one half cycle delay.

The disadvantage of this device is that there is only a one-to-one relationship between E and $B_{max}-B_1$ whereas in the conventional system the value of $B_1$ is extremely sensitive to control current which in turn gives the conventional system very high gain as an amplifier. However, when used as a regulator, the insensitivity of the new magamp to changes in core characteristics, frequency, and input voltage reduces the gain requirement, offsetting the disadvantage of low gain.

The objects of the invention are achived with the regulator circuitry as described above. In one specific unit incorporating the control stage of FIG. 3, the output voltage is maintained at 19 volts with a maximum deviation of ±0.2 volt while the supply voltage varies ±7 volts from a nominal voltage of 25 volts, with the source voltage variation occurring in the frequency range of 30 c.p.s. to 100 kc.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a voltage regulator for operation from a D.C. power source and including a driver stage for driving an inverter stage, with the driver stage having a pair of transistors, the improvement comprising in combination:

an oscillator energized from said D.C. power source and producing an output at first and second terminals, said oscillator output having an amplitude varying as a function of the amplitude of said D.C. power source and having a frequency substantially independent of the amplitude of said D.C. power source; and circuit means for coupling said oscillator terminals to the bases of the driver stage transistors for cyclically switching the transistors between on and off states with each half cycle of oscillator output, with the transistors out of phase with each other, said circuit means including variable impedance integrating means for providing a high impedance at the start of a half cycle of the oscillator output to switch a transistor to one state, and changing to a low impedance when the integral of oscillator output voltage with time reaches a predetermined value to switch the transistor to the opposite state prior to the end of the half cycle, whereby the conduction times in the driver state and in the inverter stage are varied as a function of the magnitude of said D.C. source and comprising:

a magnetic amplifier having first and second gate windings and a control winding;

a first rectifier and a first current limiting resistance connected in series with said first gate winding between said first terminal and one of said transistor bases;

a second rectifier and a second current limiting resistance connected in series with said second gate winding between said second terminal and the other of said transistor bases, with said rectifiers polarized in the same direction;

a third resistance connected between said first terminal and said other transistor base;

a fourth resistance connected between said second terminal and said one transistor base; and means for connecting a variable D.C. current source to said control winding.

2. A regulator as defined in claim 1 in which said magnetic amplifier includes first and third gate windings on a first core and second and fourth gate windings on a second core and a control winding common to both core; and said circuit means includes:
means for connecting a D.C. voltage source to each of said third and fourth windings; and
a rectifier connected in series with each of said third and fourth windings and polarized oppositely to the D.C. source connected thereto.

3. A regulator as defined in claim 2 including:
a third rectifier connecting said one transistor base to circuit ground and polarized opposite to said first rectifier; and
a fourth rectifier connecting said other transistor base to circuit ground and polarized opposite to said second rectifier.

4. In a voltage regulator for operation from a D.C. power source and including a driver stage for driving an inverter stage, with the driver stage having a pair of transistors, the improvement comprising in combination:

an oscillator energized from said D.C. power source and producing an output at first and second terminals, said oscillator output having an amplitude varying as a function of the amplitude of said D.C. power source and having a frequency substantially independent of the amplitude of said D.C. power source; and circuit means for coupling said oscillator terminals to the bases of the driver stage transistors for cyclically switching the transistors between on and off states with each half cycle of oscillator output, with the transistors out of phase with each other, said circuit means including variable impedance integrating means for providing a high impedance at the start of a half cycle of the oscillator output to switch a transistor to one state, and changing to a low impedance when the integral of oscillator output voltage with time reaches a predetermined value to switch the transistor to the opposite state prior to the end of the half cycle, whereby the conduction times in the driver stage and in the inverter stage are varied as a function of the magnitude of said D.C. source, said variable impedance integrating means including saturable magnetic core means with a first winding connected in circuit between said first terminal and one of said transistor bases and a second winding connected in circuit between said second terminal and the other of said transistor bases, and with a first resistance connected in circuit between said first terminal and said other transistor base and a second resistance connected in circuit between said second terminal and said one transistor base.

5. A regulator as defined in claim 4 including an additional winding on said core means and magnetically coupled with said first and second windings, and means for connecting a variable D.C. current source to said additional winding.

6. In a voltage regulator for operation from a D.C. power source and including a driver stage for driving an inverter stage, with the driver stage having a pair of transistors, the improvement comprising in combination:

an oscillator energized from said D.C. power source and producing an output at first and second terminals, said oscillator output having an amplitude varying as a function of the amplitude of said D.C. power source and having a frequency substantially independent of the amplitude of said D.C. power source; and circuit means for coupling said oscillator terminals to the bases of the driver stage transistors for cyclically switching the transistors between on and off states with each half cycle of oscillator output, with the transistors out of phase with each other, said circuit means including variable impedance integrating means for providing a high impedance at the start of a half cycle of the oscillator output to switch a transistor to one state, and changing to a low impedance when the integral of oscillator output voltage with time reaches a predetermined value to switch the transistor to the opposite state prior to the end of the half cycle, whereby the conduction times in the driver stage and in the inverter stage are varied as a function of the magnitude of said D.C. source, and comprising:

first and second saturable core reactors;

a first rectifier and a first current limiting resistance connected in series with the winding of said first reactor between said first terminal and one of said transistor bases;

a second rectifier and a second current limiting resistance connected in series with the winding of said second reactor between said second terminal and the other of said transistor bases, with said rectifiers polarized in the same direction;

a third resistance connected between said first terminal and said other transistor base; and a fourth resistance connected between said second terminal and said one transistor base.

7. A regulator as defined in claim 6 including:
a third rectifier connecting said one transistor base to circuit ground and polarized opposite to said first rectifier; and
a fourth rectifier connecting said other transistor base to circuit ground and polarized opposite to said second rectifier.

References Cited

UNITED STATES PATENTS

| | | | |
|---|---|---|---|
| 2,990,516 | 6/1961 | Johannessen | 330—10 |
| 3,128,438 | 4/1964 | Suda | 321—45 X |
| 3,219,907 | 11/1965 | Josephson | 321—2 X |
| 3,222,618 | 12/1965 | Ressler | 321—2 X |
| 3,317,856 | 5/1967 | Wilkinson | 321—45 |

FOREIGN PATENTS 1,190,868   4/1959   France.

LEE T. HIX, *Primary Examiner.*

W. H. BEHA, JR., *Assistant Examiner.*